Oct. 27, 1953 R. L. WALLACE, JR 2,657,360

FOUR-ELECTRODE TRANSISTOR MODULATOR

Filed Aug. 15, 1952 5 Sheets-Sheet 1

INVENTOR
R. L. WALLACE, JR.
BY Harry C. Hart
ATTORNEY

INVENTOR
R. L. WALLACE, JR.
BY Harry C. Hart
ATTORNEY

FOUR-ELECTRODE TRANSISTOR MODULATOR

Filed Aug. 15, 1952 5 Sheets-Sheet 3

INVENTOR
R. L. WALLACE, JR.
BY Harry C. Hart
ATTORNEY

Oct. 27, 1953 R. L. WALLACE, JR 2,657,360

FOUR-ELECTRODE TRANSISTOR MODULATOR

Filed Aug. 15, 1952 5 Sheets-Sheet 4

INVENTOR
R. L. WALLACE, JR.
BY Harry C. Hart
ATTORNEY

Oct. 27, 1953 R. L. WALLACE, JR 2,657,360

FOUR-ELECTRODE TRANSISTOR MODULATOR

Filed Aug. 15, 1952 5 Sheets-Sheet 5

INVENTOR
R. L. WALLACE, JR.
BY Harry C. Hart
ATTORNEY

Patented Oct. 27, 1953

2,657,360

UNITED STATES PATENT OFFICE 2,657,360

FOUR-ELECTRODE TRANSISTOR MODULATOR

Robert L. Wallace, Jr., Plainfield, N. J., assignor to Bell Telephone Laboratories, Incorporated, New York, N. Y., a corporation of New York Application August 15, 1952, Serial No. 304,569

11 Claims. (Cl. 332—52)

This invention relates to semiconductor signal translating apparatus and more particularly to signal-modulating apparatus of the class now known as transistors. It has for its principal objects to extend the frequency range and increase the efficiency of operation of transistor modulators.

In general, a transistor comprises a body of semiconductive material having three connections thereto, termed the emitter, the collector, and the base. In one manner of operation, signals are impressed between the emitter and the base and amplified replicas thereof appear in a load circuit connected between the collector and the base. The devices may be of any one of several specifically different types. In one, of which the devices disclosed in Patent 2,524,035, granted October 3, 1950, to J. Bardeen and W. H. Brattain are illustrative, the emitter and collector connections are point contacts. In another, of which the devices disclosed in an article by Shockley, Pearson and Haynes, published in the Bell System Technical Journal, July 1949, pages 435 et seq. and in Patent 2,569,347, granted September 25, 1951, to W. Shockley are illustrative, either the emitter or the collector or both includes a junction between two zones of opposite conductivity type in the semiconductive body. Such a junction is commonly designated a P—N (or N—P) junction and is so referred to herein. Techniques for fabricating such a unit are described in an application of G. K. Teal, Serial No. 168,184 filed June 15, 1950 and in a publication in the Physical Review for February 15, 1951, vol. 81, page 637.

In an application of R. L. Wallace, Jr., Serial No. 294,298, filed June 19, 1952, there is described a new and improved transistor of the junction variety which is distinguished from its predecessors by the addition of an auxiliary base electrode. Like the normal base electrode, the auxiliary one is connected to the intermediate semiconductor zone, but the connection is made at a part of that zone which is spatially removed from the normal base connection. Application of a small voltage of appropriate magnitude and sign between the normal base electrode and the auxiliary base electrode results in the flow of an auxiliary current from one of these two electrodes to the other. It has been discovered that this voltage or current produces a marked reduction in the base resistance of the transistor; and. since this base resistance is the source of a diminution of the transistor gain at high frequencies, reduction of this base resistance results in enhanced high frequency operation.

The present invention is based on the discovery that several of the transistor parameters, notably its effective base resistance $r_b$ and its current multiplication factor $\alpha$, vary widely with small changes in the base-to-base current within a suitable range. Indeed, the base resistance changes from a magnitude of the order of 1200 ohms when the auxiliary base-to-base current is zero to a value of 10 ohms or less for a base-to-base current of about 0.11 milliampere and varies in a substantially linear fashion with the base-to-base current between these values. In accordance with the invention, therefore, a modulating signal is applied to the auxiliary base electrode and is adjusted to supply a current which varies with the modulating signal within the range zero to 0.2 milliampere or so. With this arrangement, the collector output current, which by virtue of well-known transistor action is an amplified replica of the input signal current applied to the emitter electrode, is modulated through a wide range in dependency on the modulating signal.

In addition to the base resistance and the current multiplication factor, it turns out that the emitter resistance and the collector resistance of the transistor likewise depend for their magnitudes on the magnitude of the base-to-base current. These dependencies also produce modulation of the output collector current in relation to the modulating signal. By judicious selection of the external circuit in the light of its intended use, some selected one of these effects may be caused to predominate.

As with modulators generally, there are thus two input terminals, namely, the emitter connection and the auxiliary base connection, and it is perhaps a matter of point of view or convenience whether to regard the signal applied to the emitter as the principal one and that applied to the auxiliary base electrode as the modulating signal or vice versa. In particular, if the emitter current be held constant and a signal applied to the auxiliary base electrode, this signal is not only translated into the collector output circuit, but the translation is accompanied by a power gain.

Furthermore, with an appropriate steady bias applied to the collector, an input signal applied to the emitter may be withdrawn, with some amplification, from the auxiliary base connection. As in other situations in which power amplification is available, any such output, i. e., from the collector or from the auxiliary base connection, may be fed back to any such input to maintain self-oscillation, regard being of course had to considerations of impedance-matching and phase adjustment in the feedback path.

When self-oscillations are maintained by feedback, for example from the collector to the auxiliary base connection, these oscillations may conveniently be modulated by application of an input signal to some other input point, for example, the emitter. Because both the frequency of oscillation and its amplitude depend in general on some parameter of the transistor which in turn depends on the auxiliary base current, frequency modulation and amplitude modulation normally occur together. If frequency modulation alone is desired, the amplitude modulation may be removed by the addition of a limiter. If, on the other hand, amplitude modulation of a constant-frequency carrier is desired, it is preferable to derive the carrier from an external source, and to employ the transistor solely as a modulator without back-coupling or self-oscillation.

The invention will be fully apprehended by reference to the following detailed description of preferred illustrative embodiments thereof taken in connection with the appended drawings in which:

In the schematic circuit diagrams of Figs. 1–8, Fig. 1 shows a four-electrode transistor modulator in accordance with the invention;

Figure 13:
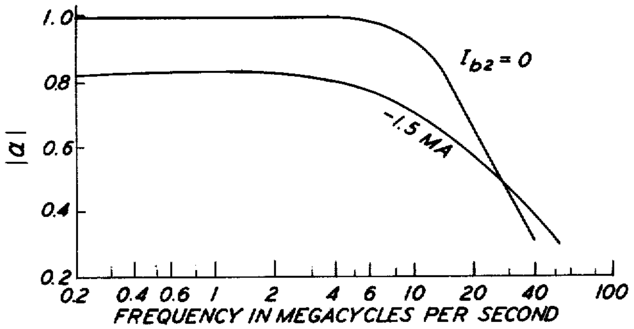
Figure 14:
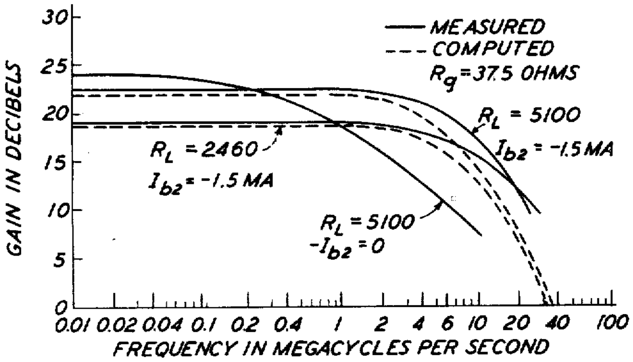
Figure 15:
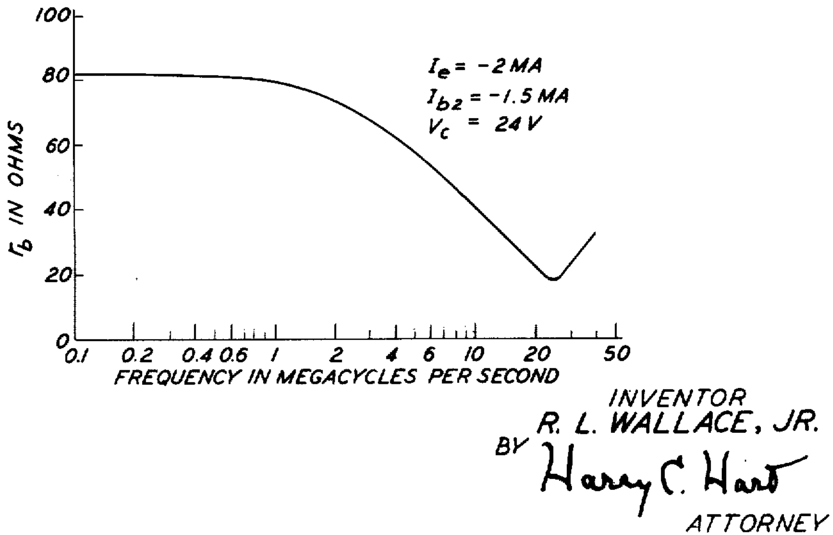

In the curves of Figs. 9–15, Figs. 9, 10, 11 and 12 show the variations with auxiliary base current of transistor base resistance, current multiplication factor, emitter resistance and collector resistance, respectively;

Figs. 13 and 14 show the improvement in current multiplication factor and in stage gain which result at high frequencies from the addition of the auxiliary base connection and its bias; and Fig. 15 shows the variation of transistor base resistance with frequency in the presence of an auxiliary base connection current.

Referring now to the drawings, Figs. 9–15 show various characteristics of the novel four-electrode transistor and the fashion in which they vary with base-to-base current and with frequency.

Figure 1:
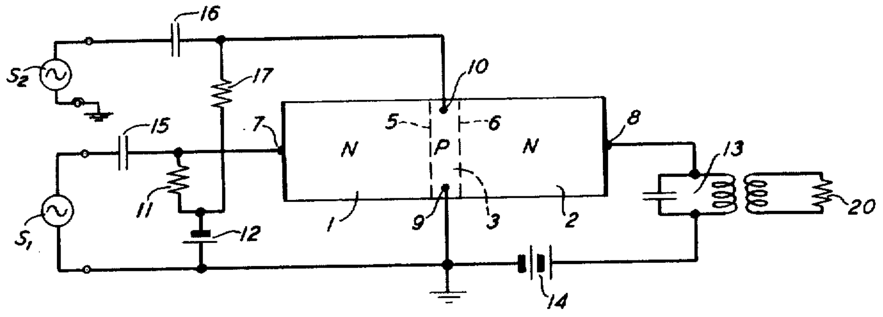

Fig. 1 shows such an N—P—N junction transistor as fabricated for example in accordance with the teachings of the aforementioned application of G. K. Teal. It has an emitter zone 1 and a collector zone 2, each of N-type material, and an intermediate thinner base slab, or zone 3, of P-type material. The latter forms an emitter junction 5 with the emitter zone 1 and a collector junction 6 with the collector zone 2. The device is provided with the customary emitter and collector connections 7, 8 to the emitter and collector zones 1, 2 and with the normal base connection 9 to the intermediate base zone 3. It is provided in addition with an auxiliary base connection 10 to the intermediate base zone. For operation as a modulator in the grounded base configuration, the normal base electrode 9 may be connected to ground, while the emitter connection 7 is returned to it by way of a voltage-supporting resistor 11 and a potential source 12 which applies a negative potential of appropriately small magnitude to the emitter connection 7. The collector connection 8 is returned to ground by way of a frequency selective network 13, which may be coupled to a load 20, and a second potential source 14 which applies a larger positive potential to the collector connection. A first signal $S_1$ may be applied for example by way of a blocking condenser 15 to the emitter connection 7 and a second signal $S_2$ may be similarly applied by way of another blocking condenser 16 to the auxiliary base electrode 10.

The auxiliary base electrode 10 may be biased negatively in the amount of one or two volts, as by returning it to ground by way of a resistor 17 and a battery which, for the sake of convenience, may be the emitter bias battery 12. The bias battery causes a bias current to flow in the base-to-base circuit. The polarities of the potential sources are those appropriate for a transistor of the N—P—N variety. For a P—N—P transistor all polarities should be reversed.

Figure 9:
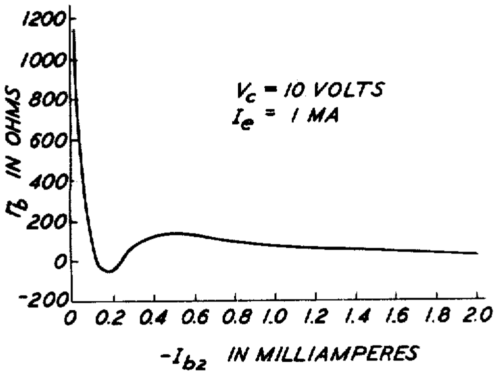

It is explained in the aforementioned application of R. L. Wallace, Jr. that application of a negative bias of the magnitude of about two volts to the auxiliary base electrode 10 greatly reduces the effective cross sectional area of the emitter junction 5, restricting it to that part of this junction which lies in the immediate vicinity of the normal base electrode 9. In consequence of this action, the effective base resistance $r_b$ of the transistor is greatly reduced as compared with its magnitude in the absence of the auxiliary base electrode 10 and its bias current. This effect is shown in Fig. 9. It is further shown in that application that this reduction of base resistance results in a great enhancement of high frequency operation of the transistor as an amplifier for signals applied to its emitter connection. These effects are shown in Fig. 14.

The present invention is based in part on the discovery that this enhancement of high frequency operation may be varied under the control of a signal applied to the auxiliary base electrode 10. Thus, in the apparatus of Fig. 1 when it is employed for example in radio transmitter apparatus to modulate voice signals on to a radio frequency carrier, the signal source $S_1$ may be a carrier source of constant amplitude and constant frequency while the signal source $S_2$ may be an audio source, for example, a microphone. Disregarding the auxiliary base electrode 10, the transistor operates as an amplifier for the high frequency carrier signals of the source $S_1$. The source $S_2$ then operates to vary the amplifier gain so that, finally, the signals of the source $S_1$ are modulated by those of the source $S_2$, i. e., the carrier signals are modulated by the voice signals. Modulation products of various frequencies appear translated and amplified in the collector circuit as output and a desired one of these modulation products may be selected and the others suppressed by inclusion of the frequency selective network 13.

It is frequently of importance to change the carrier frequency of a modulated signal. A familiar example is that of a so-called "first detector" in a superheterodyne radio receiver, whose function is to change the high frequency of a received radio carrier wave to an intermediate frequency, e. g., 465 kilocycles per second, in order that the latter may be further amplified and purified of undesired components by stages whose tuning is fixed, which may be designed to pass the intermediate frequency and its audio sidebands and to exclude all other signals. The apparatus of Fig. 1 operates in this fashion. The incoming modulated carrier wave may be applied as a signal $S_1$ to the emitter connection, while the modulating signal $S_2$ is furnished by the output of a local oscillator which is preferably, although not necessarily, isolated from the four-electrode transistor to minimize influences which the incoming signal might otherwise have on the oscillator frequency.

Figure 2:
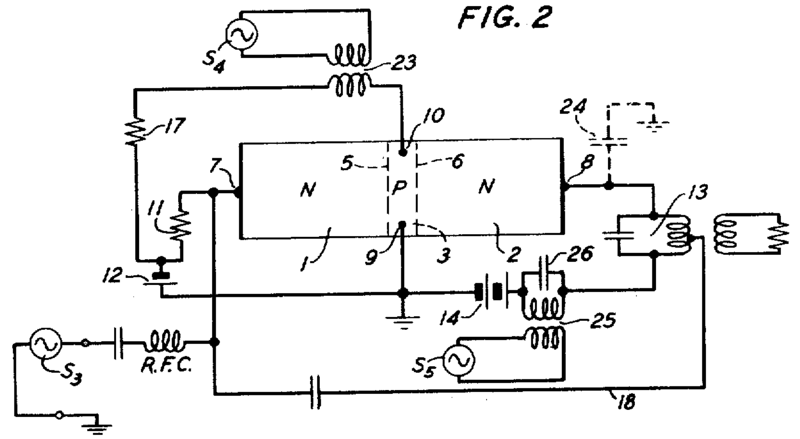
Fig. 2 shows an extension of the modulator of Fig. 1 to provide a self-oscillator and a frequency converter.

Inasmuch as the apparatus of Fig. 1 is an amplifier for signals applied to its emitter electrode without regard to its auxiliary base electrode, it follows that a self-oscillating circuit may be constructed by feeding back power from its collector connection 8 to its emitter connection 7 in an amount sufficient to maintain self-oscillation. The feedback network may be of any desired variety but, insofar as the transistor is primarily a current-operated device, a current feedback path is preferred. Fig. 2 shows a self-oscillator of this sort. It is the same as the modulator of Fig. 1, but for the omission of the sources $S_1$ and $S_2$ and the addition of a current feedback path 18 which is connected between an appropriately located tap on one winding of its output transformer and, if desired, by way of a blocking condenser, to the emitter electrode 7. The oscillation frequency is determined by the selective network 13.

Another apparatus element which is common in the art of radio reception is a so-called heterodyne converter, namely, an oscillator whose output oscillations are modulated by an input signal, and the apparatus of Fig. 2 serves well in this capacity. An input signal may be applied to the emitter connection 7, to the auxiliary base connection 10, or to the collector connection 8 of the oscillator of Fig. 2, and in either event, the output derived from the collector connection 8 comprises self-oscillations which are modulated by such input signal.

In a converter of this sort the principal and desired effect is amplitude modulation of locally-generated self-oscillations. It turns out, however, that an incidental effect of the incoming signal is to produce frequency modulation of the locally generated oscillations. At the low oscillation frequencies (e. g., 1000 kilocycles per second) customarily employed in conventional frequency converters this frequency modulation is small, incidental and unimportant. When, on the other hand, the oscillation frequency is raised to 100 megacycles or thereabouts, the magnitude of the frequency deviation is raised proportionately, indeed to a degree appropriate for use with conventional frequency modulation receivers, and this may be turned to good account in the construction of a generator of frequency modulated oscillations.

While, in general, application of an input modulating signal to any point of the feedback path 18 may affect the magnitude of any or all of the transistor parameters and so the oscillation frequency, it appears that the principal effects may be correlated with the input points in the following fashion: When the modulating signal derived, for example, from a source $S_3$ is applied to the emitter connection 7, it directly affects the magnitude of the emitter resistance $r_e$ and this in turn alters the phase shift around the feedback loop from the value it would have if due only to the feedback path condenser. Such alteration of phase shift affects the frequency of oscillation. A radio frequency choke is preferably included between the source $S_3$ and the emitter in order to isolate the self-oscillating circuit from the input source.

When, in the second place, an input signal derived, for example, from the source $S_4$ is applied, e. g., by way of a transformer 23 to the auxiliary base electrode 10, it acts in the fashion discussed above to cause variations of $r_e$, $r_b$, $r_c$ and $\alpha$ as shown in Figs. 9, 10, 11 and 12, respectively. While some of these variations may tend to offset others, a residual variation appears which is sufficient to cause substantial modulation of the oscillation frequency. In addition, by varying the potential across the collector junction, it varies the effective ground capacitance 24 of this junction which again results in frequency modulation. It may indeed be that this variation of the effective output capacitance of the transistor is the principal factor in promoting frequency variations.

When in the third place, an input signal derived for example, from the source $S_5$ is applied, e. g., by way of a transformer 25 to the collector electrode 8, it appears that the principal effect is to modulate the potential of the collector junction and so of its effective capacitance and that this is the principal cause of frequency variations.

Because of the location of the transformer 25 at a point of the collector-to-base circuit where high frequency currents are present in large amounts, it is preferred to connect a bypass condenser 25 across the secondary winding of this transformer. Its input signal frequency impedance should of course be high.

The four-electrode transistor of the aforementioned application of R. L. Wallace, Jr., has been found to act as an amplifier in another fashion over and above that heretofore described, namely, by introducing signals on the auxiliary base electrode 10 and recovering them in the circuit of the collector 8. Referring again to Fig. 1, this is tantamount to disabling the source $S_1$, and so applying a steady bias to the emitter connection 7 while employing the source $S_2$ as the input source. The manner in which such an amplifier operates will be understood when it is recalled that, for any junction transistor, the collector current is principally determined by the product of the current multiplication factor $\alpha$ and the emitter current $I_e$. As explained above, and as indicated in Fig. 10, the current multiplication factor $\alpha$ is found to depend very closely on the magnitude of the auxiliary base current. From this it follows that a signal applied to the auxiliary base electrode reappears translated in the collector circuit.

Furthermore, this translation is accompanied by amplification, provided a sufficient disparity exists between output impedance and input impedance. Experimentally it is found that the base-to-base impedance of the transistor is only a few hundred ohms while the collector impedance is of the order of meghoms. With such a wide disparity between the output impedance and the input impedance the observed values of current amplification from the base-to-base circuit as input to the collector circuit as output are quite adequate to give rise to power gain.

Figure 3:
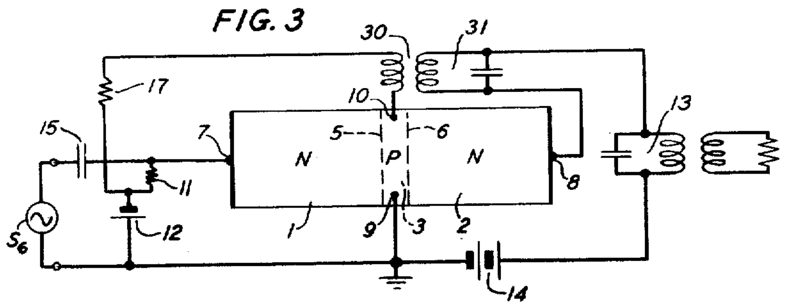
Fig. 3 shows an alternative to the converter of Fig. 2.

From the foregoing, it is apparent that self-oscillations can also be maintained by feeding back collector output power, not to the emitter connection 7 as in Fig. 2, but to the auxiliary base connection 10 as in Fig. 3. The transistor and its emitter and collector bias sources are the same as before. Feedback from collector to auxiliary base electrode may be accomplished in any desired fashion but, because of the aforesaid wide disparity of impedances, a stepdown transformer 30 of appropriately large turns ratio is preferred.

The self-oscillations maintained with the circuit of Fig. 3 may be controlled by a selective network 31, and they may be modulated by the application of a modulating signal $S_6$ to almost any active electrode, but in particular to the emitter connection 7.

Figure 10:
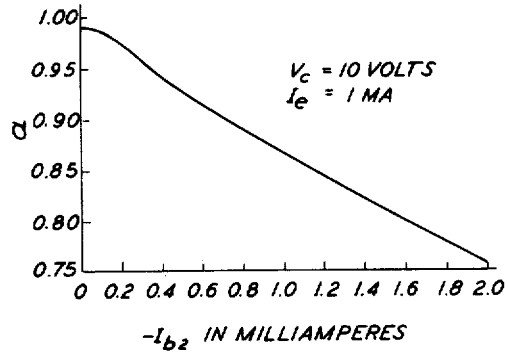
Figure 11:
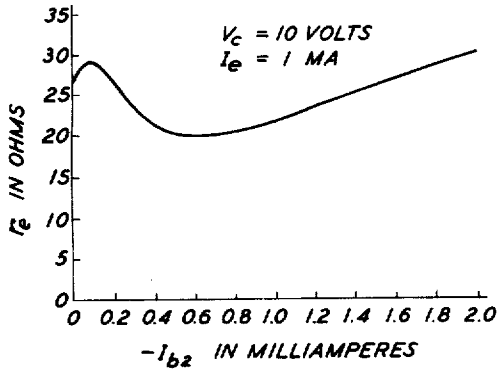
Figure 12:
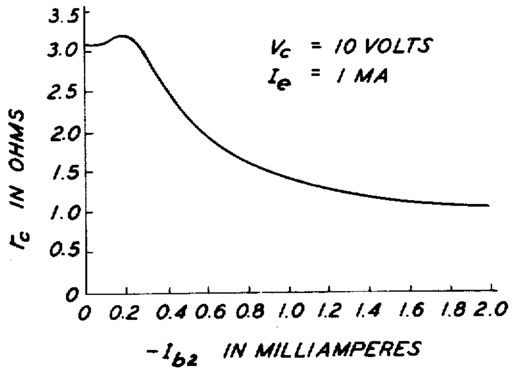

It is to be noted that while, with the grounded base configuration there is no phase reversal as between a signal injected in the emitter connection 7 of the transistor and withdrawn at the collector connection 8, such phase reversal does hold as between the auxiliary base connection 10 and the collector. It arises by reason of the fact that, as shown by Figs. 9 and 10, an increase in the auxiliary base current causes a reduction in the current amplification factor and therefore, as previously discussed, in the collector current. This phase reversal may be compensated by appropriately poling the respective windings of the feedback transformer 30 of Fig. 3.

Figure 4:
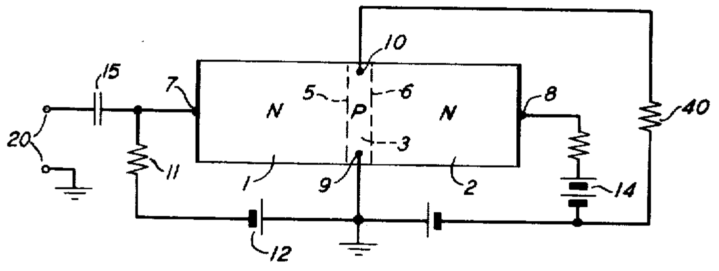
Fig. 4 illustrates amplification by a four-electrode transistor in a different fashion.
Figure 5:
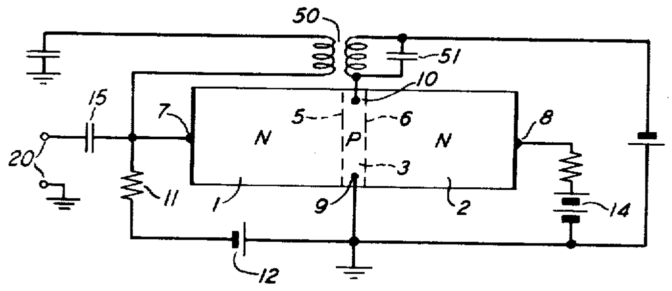
Fig. 5 shows a self-oscillator employing the amplifier of Fig. 4.

Fig. 4 shows still a third way in which the four-electrode transistor may act to amplify a signal applied to its input terminals 20, e. g., between its emitter electrode 7 and its base electrode 9. When the emitter is biased in the forward direction so that electrons are injected into the P-type layer 3, the effect is to reduce the apparent resistivity of the P-type layer. As a result, signals applied to the emitter connection appear translated in the auxiliary base connection 10 as output. A load 40 may then be connected between the auxiliary base connection 10 and the normal base connection 9. When the device is operated in this fashion, the collector electrode 8 may be held at a steady potential of very low value provided it is not biased in the forward direction, which in the present case means negatively biased. Indeed, the collector may be disconnected. In Fig. 5, which is otherwise the same as Fig. 4, the output power of the auxiliary base electrode 10 is fed back by way of an impedance-matching transformer 50, tuned by a condenser 51, to the emitter connection 7. In this case, no phase reversal takes place in the signal translation through the transistor and, in consequence, the transformer should be poled to produce no compensating phase reversal.

Figure 6:
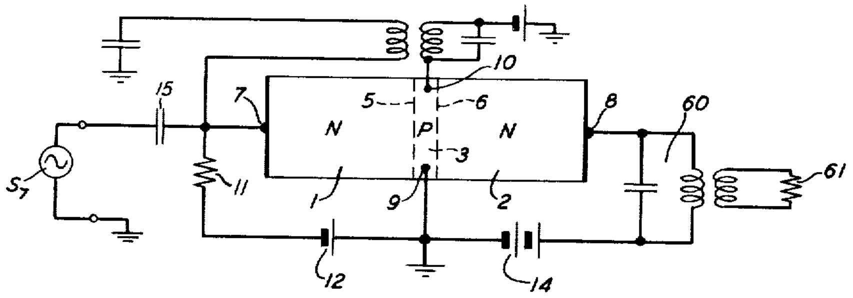
Fig. 6 shows a frequency converter based on the oscillator of Fig. 5.

The arrangement of Fig. 5 lends itself readily to employment as a converter, and Fig. 6 shows an appropriate circuit arrangement. It differs from Fig. 5 only by the addition, in the collector circuit, of a frequency selective network 60 which feeds a load 61 and by the addition of a signal source $S_7$, for example a modulated carrier wave source, connected to its emitter electrode 7. Self-oscillations are generated in the manner of Fig. 5, while the signals applied to the emitter electrode 7 from the external source $S_7$ are translated by straightforward three-electrode transistor action into the output circuit 60, 61. A convenient way in which to regard the interaction of these two effects is that the amplification of the signals translated from emitter to collector is varied at the self-oscillation rate by the oscillation signal applied from the auxiliary base electrode 10, to the emitter electrode 7.

The modulators (or mixers or oscillators or converters) described in the foregoing are particularly effective at high (megacycle range 2) frequencies. This is for the reason that a transistor amplifier of the grounded base configuration is especially sensitive to changes in its base resistance. Reference to Figs. 9 and 10 shows that both the base resistance $r_b$ and the current multiplication factor $\alpha$ fall with increasing auxiliary base current. While the amplifier gain is reduced by a reduction in $\alpha$, this effect is not very pronounced at high frequencies at which, as shown by Fig. 10, $\alpha$ departs substantially from unity. However, at low (kilocycle range) frequencies at which the value of $\alpha$ is very nearly unity, the effect of variations in $\alpha$ tends to offset the effect of variations in $r_b$, thus reducing the effectiveness of the auxiliary base electrode current for control purposes.

Figure 7:
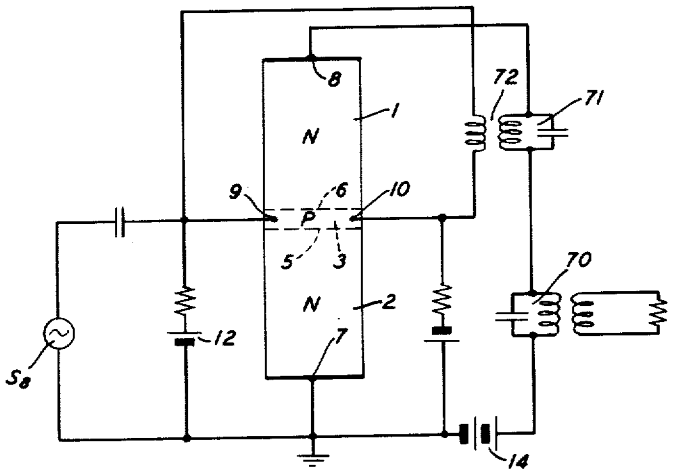
Fig. 7 shows an oscillator and frequency converter employing a four-electrode transistor connected in the grounded emitter configuration.

This difficulty can be surmounted by employing the grounded emitter connection. A modulator so constructed and employing the same transistor is shown in Fig. 7. Here the signal input to be modulated, e. g., the carrier $S_8$, is applied to the normal base connection 9, the emitter connection 7 being grounded, while the modulating signal may be applied to the auxiliary base connection 10 and the modulation product appears in the circuit of the collector 8 as output. As before, a frequency selective network 70 may be included in the collector circuit to discriminate against all signals other than the desired modulation product.

Referring to an article by R. L. Wallace, Jr., and W. J. Pietenpol in the Bell System Technical Journal for July, 1951, volume 30, page 530 and in particular to Equation 33 thereof, it is there shown that, with a junction transistor amplifier connected in the grounded emitter configuration, provided the external load resistance is small in comparison with the collector resistance, the collector or output current $i_2$ is related to the emitter or input current $i_1$ to a good approximation by the equation $$\frac{i_2}{i_1}=\frac{\alpha}{1-\alpha} \tag{2}$$

Hence, especially when $\alpha$ is close to unity, as it is at low frequencies, this current ratio is very sensitive to changes in $\alpha$. Therefore, if in such a stage the auxiliary base current is varied, the current ratio, and so the gain of the stage, is varied in accordance with the variations in $\alpha$. Thus, any signal transmitted through the stage from emitter to collector is modulated in accordance with the signal applied to the auxiliary base electrode.

By the addition of a feedback path, for example from the collector electrode to the base-to-base circuit by way of an appropriately poled transformer 72, self-oscillations may be maintained in the fashion described in connection with Fig. 3, their frequency being determined by a selective network 71. This oscillation causes a variation of $\alpha$ and hence, as previously discussed, modulates the base-to-collector gain for a signal, for example an incoming modulated carrier wave, which is applied to the normal base electrode 9.

Figure 8:
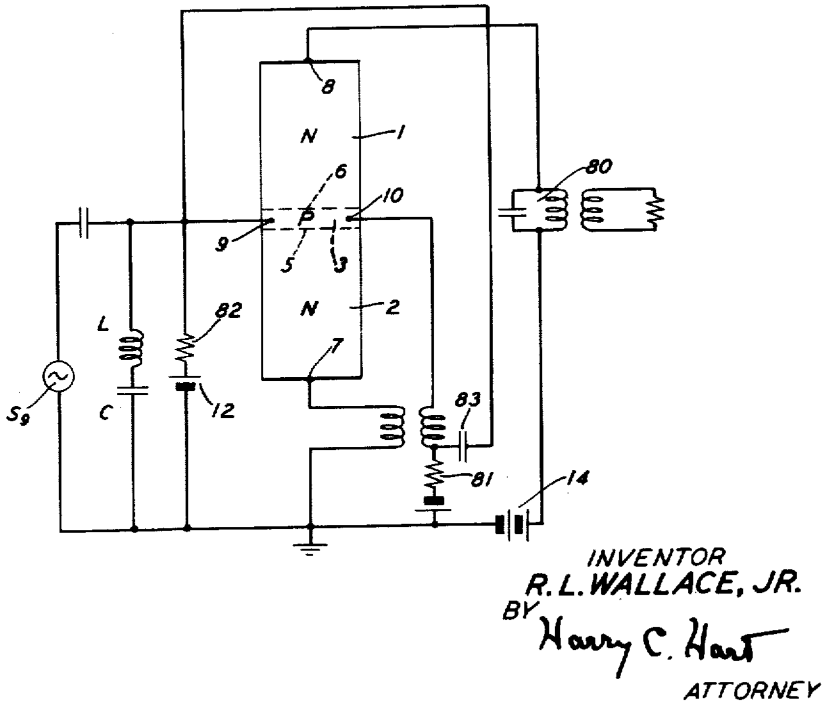
Fig. 8 shows an alternative to Fig. 7.

Still another converter circuit appropriate for use at low frequencies is shown in Fig. 8 wherein the local oscillations are produced by feedback from the auxiliary base electrode 10 to the emitter connection 7, the external signal, for example an incoming modulated carrier wave $S_9$, being applied to the normal base electrode 9 as before and the output taken by way of a frequency selective network 80 in the customary fashion, the latter being preferably tuned to the desired intermediate frequency. A series tuned inductance-capacitance combination may be connected between the normal base electrode 9 and ground. Provided the auxiliary base biasing resistor 81 and the normal base biasing resistor 82 are both of high resistance, and provided, further, that the blocking condenser 83 is of low impedance, the oscillating circuit is completed by way of this LC combination which thus provides tuning. This arrangement permits the impedance of the stage as a whole to be high at the carrier frequency.

In Fig. 13, the upper curve shows the variation of $\alpha$ with frequency for an N—P—N junction transistor before the addition of the base-to-base bias of the invention. Its low frequency value $\alpha_0$ is very slightly less than unity. Commencing at a frequency of about 3 megacycles per second, it begins to fall in amplitude, being reduced to 70 per cent of its original amplitude at 20 megacycles per second.

The lower curve shows the frequency variation of $\alpha$ for the junction transistor to which has been added the auxiliary base contact and the base-to-base voltage and a transverse current of 1.5 milliamperes. It may be denoted $\alpha'$. Its low frequency value $\alpha'_0$ is less than the original low frequency value $\alpha_0$ but it follows the same trend, falling to 70 per cent of its low frequency value at 20 megacycles per second. Thereafter it falls less steeply than the upper curve.

In Fig. 14, the curve labeled "$I_{b2}=0$" shows the corresponding variation of the voltage gain. Starting with a magnitude of 24 decibels at low frequencies it commences to fall at about 0.1 megacycle per second, falling to 70 per cent of its low frequency value at a frequency of about one megacycle per second and continuing to fall thereafter with a slope of approximately 6 decibels per octave.

The two remaining solid curves show, for two different values of load resistance, the frequency variation of the voltage gain and illustrate the great improvement which is achieved by the practice of the invention. While their low frequency values are about 18 decibels and 22 decibels, as compared with 24 decibels for the unbiassed curve, they do not commence to fall until a frequency of about 5 megacycles per second is reached, falling to 70 per cent of their low frequency values at a frequency of about 17 megacycles per second.

This frequency, at which the biased gain curves fall to 70 per cent of their low frequency values, is termed the high frequency "cutoff" of the unit which includes the improved transistor as its active element. The 70 per cent relation is convenient for computation, but it of course does not indicate that the transistor is inoperative at higher frequencies. On the contrary, with a sufficiently large gain at low frequencies, and a 70 per cent of this large gain remaining at 20 megacycles per second, and with decrease of gain at still higher frequencies at the rate of about 6 decibels per octave, there may well remain a substantial amount of gain several octaves above this cutoff frequency. This has been confirmed experimentally.

The great improvement in high frequency gain depicted in Fig. 14, despite the falloff of $\alpha$ with frequency depicted in Fig. 13, is believed to be due at least in part to a compensating reduction in base resistance with frequency as depicted in Fig. 15.

What is claimed is:

1. Signal translating apparatus which comprises a body of semiconductive material having therein a first and a second zone of one conductivity type and a third zone of opposite conductivity type between said first and second zones and forming a first junction with the first zone and a second junction with the second zone, an emitter connection to the first zone, a collector connection to the second zone, a normal base connection to one part of the third zone, an auxiliary base connection to another part of the third zone, input circuit means for applying a first input signal to the emitter connection, an output circuit including a load connected to said collector connection, and means for applying modulating signals to said auxiliary base connection, whereby a modulation product of said first input signal and said modulating signal appears in said load.

2. Signal translating apparatus which comprises a body of semiconductive material having therein a first zone of one conductivity type bounded by at least one other zone of opposite conductivity type, a normal and an auxiliary base connection to the first zone, an emitter connection and a collector connection elsewhere on the body, means for applying a first signal to one of said connections, means for applying a second signal to another of said connections, and means for deriving a modulation product of said two signals from a third one of said connections.

3. Signal translating apparatus which comprises a body of semiconductive material having therein a first and a second zone of one conductivity type and a third zone of opposite conductivity type between said first and second zones and forming a first junction with the first zone and a second junction with the second zone, an emitter connection to the first zone, a collector connection to the second zone, a normal base connection to one part of the third zone, an auxiliary base connection to another part of said third zone, means for applying a first signal to the emitter connection, means for deriving a translated signal from the collector connection, translation of said signal being dependent on the base resistance of the body, and means for varying said base resistance, thereby to modulate said translation.

4. Apparatus as defined in claim 3 wherein said base resistance-varying means comprises a source of a second signal, and means for applying said second signal to control the current of said auxiliary base connection.

5. Signal translating apparatus which comprises a body of semiconductive material having therein a first and a second zone of one conductivity type and a third zone of opposite conductivity type between said first and second zones and forming a first junction with the first zone and a second junction with the second zone, an emitter connection to the first zone, a collector connection to the second zone, a normal base connection to one part of the third zone, an auxiliary base connection to another part of said third zone, means for applying a signal to be translated to one of said emitter and auxiliary base connections, means for deriving an output signal from one of said collector and auxiliary base connections, and means for feeding back said output signal to the other of said emitter and auxiliary base connections.

6. Apparatus as defined in claim 5 wherein said output signal is derived from said collector connection and is fed back to said emitter connection.

7. Apparatus as defined in claim 5 wherein said output signal is derived from said collector connection and is fed back to said auxiliary base connection.

8. Apparatus as defined in claim 5 wherein said output signal is derived from said auxiliary base connection and is fed back to said emitter connection.

9. Signal translating apparatus which comprises a body of semiconductive material having therein a first and a second zone of one conductivity type and a third zone of opposite conductivity type between said first and second zones and forming a first junction with the first zone and a second junction with the second zone, an emitter connection to the first zone, a collector connection to the second zone, a normal base connection to one part of the third zone, an auxiliary base connection to another part of said third zone, a feedback path coupling said collector connection back to said emitter connection, thereby to promote sustained self-oscillations, and means for applying a modulating signal to one of said emitter, collector, and auxiliary base connections.

10. A modulator for use in the megacycle frequency range which comprises a body of semiconductive material having therein a first and a second zone of one conductivity type and a third zone of opposite conductivity type between said first and second zones and forming a first junction with the first zone and a second junction with the second zone, an emitter connection to the first zone, a collector connection to the second zone, a normal base connection to one part of the third zone, an auxiliary base connection to another part of said third zone, an external circuit of the grounded base configuration interconnecting said emitter, normal base, and collector connections, means for applying a signal to be modulated to said emitter connection, means for applying a modulating signal to said auxiliary base connection, and means for withdrawing a modulation product of said signals from said collector connection.

11. A modulator for use in the kilocycle range which comprises a body of semiconductive material having therein a first and a second zone of one conductivity type and a third zone of opposite conductivity type between said first and second zones and forming a first junction with the first zone and a second junction with the second zone, an emitter connection to the first zone, a collector connection to the second zone, a normal base connection to one part of the third zone, an auxiliary base connection to another part of said third zone, an external circuit of the grounded emitter configuration interconnecting said emitter, normal base and collector connections, means for applying a signal to be modulated to said normal base connection, means for applying a modulating signal to said auxiliary base connection, and means for withdrawing a modulation product of said signals from said collector connection.

ROBERT L. WALLACE, JR.

No references cited.